United States Patent [19]

Banks et al.

[11] Patent Number: 5,191,653
[45] Date of Patent: Mar. 2, 1993

[54] IO ADAPTER FOR SYSTEM AND IO BUSES HAVING DIFFERENT PROTOCOLS AND SPEEDS

[75] Inventors: John D. (J.) Banks, Palo Alto; Kenneth M. Karakotsios, San Jose; Albert M. Scalise, Campbell, all of Calif.

[73] Assignee: Apple Computer, Inc., Cupertino, Calif.

[21] Appl. No.: 635,923

[22] Filed: Dec. 28, 1990

[51] Int. Cl.[5] .............................................. G06F 13/42
[52] U.S. Cl. ................................... 395/275; 364/240.2; 364/240.3; 364/242.7; 395/725; 395/550
[58] Field of Search .......................... 395/325, 725, 550

[56] References Cited

U.S. PATENT DOCUMENTS

| 4,864,496 | 9/1989 | Triolo et al. | 395/325 |
| 4,937,733 | 6/1990 | Gillett, Jr. et al. | 395/325 |
| 5,097,437 | 3/1992 | Larson | 395/775 |

Primary Examiner—Lawrence E. Anderson
Attorney, Agent, or Firm—Blakely, Sokoloff, Taylor & Zafman

[57] ABSTRACT

A bi-directional bus adapter coupling a system bus, which operates at a first speed using a first protocol, and an IO bus, which operates at a second speed using a second protocol, and allowing data transfering devices on either bus to transfer data to or from devices on the other bus. The bus adapter includes a cycle generation mechanism which is responsive to data cycles from one of the buses in order to generate bus cycles needed to complete a data transfer to a device on the other bus. The bus adapter includes a synchronization mechanism for converting the plurality of data cycles generated by the cycle generation mechanism from either the first speed to the second speed or vice versa. The bus adapter includes bi-directional data path mechanism for routing data between the system and IO buses according to said protocols, such that the data path directs bytes of data to specific data lines to perform byte steering and dynamic bus sizing on the data from the system bus to the IO bus. The bus adapter also includes a bi-directional address transceiver mechanism for routing addresses between said system and said IO buses.

10 Claims, 6 Drawing Sheets

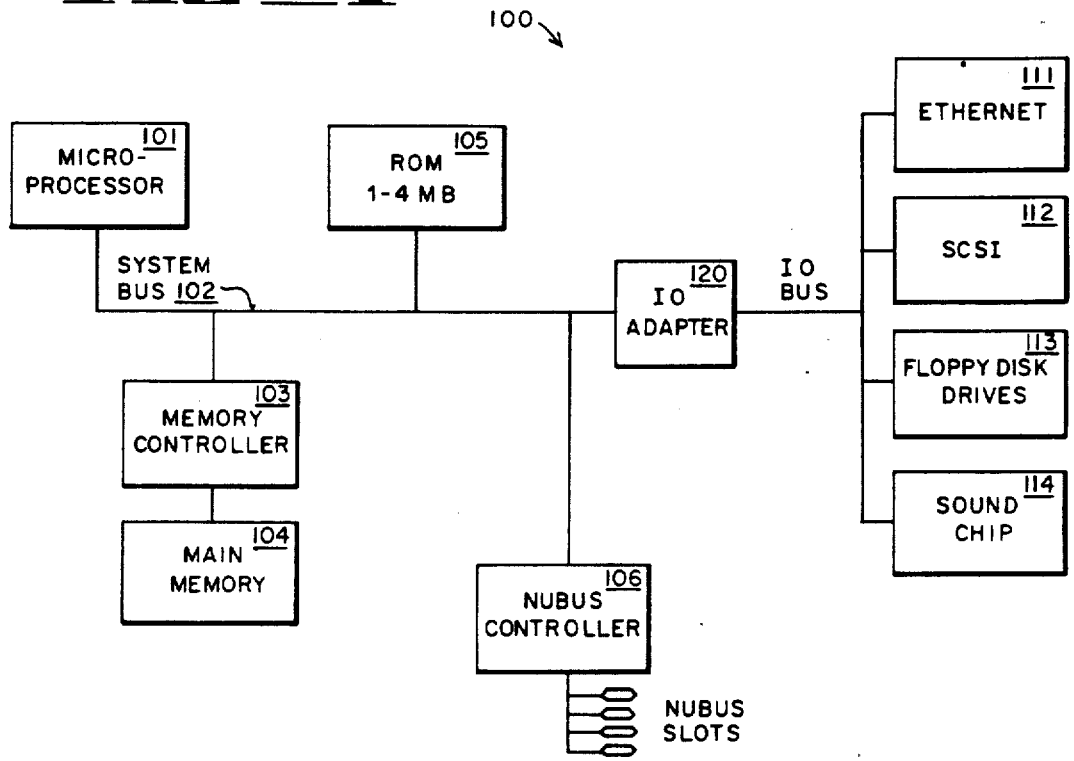
FIG_1
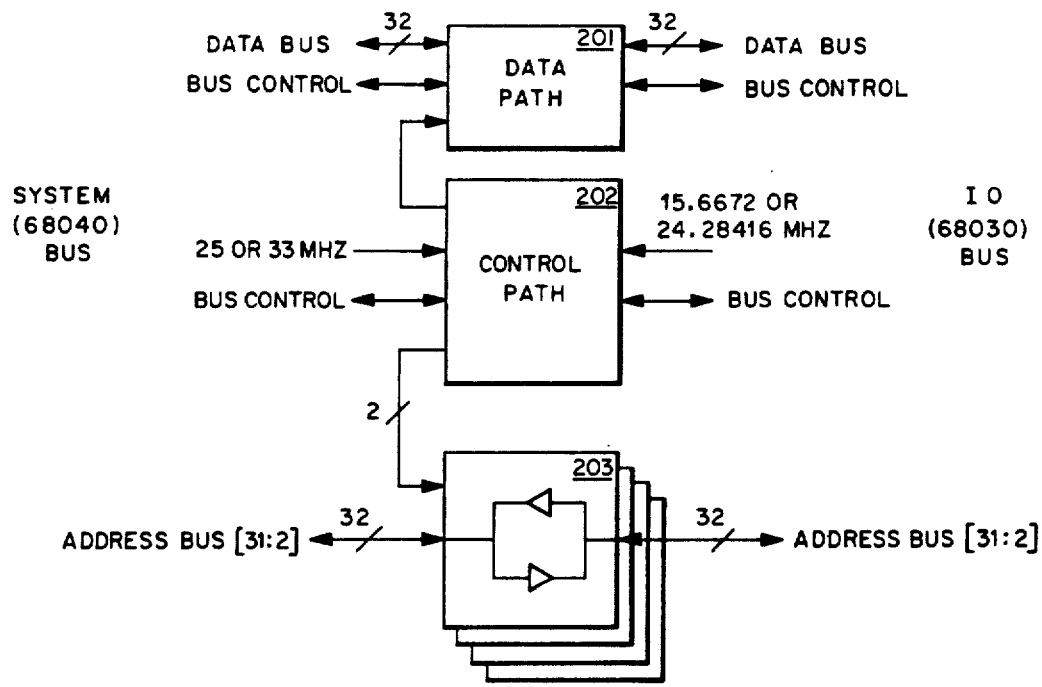
FIG_2

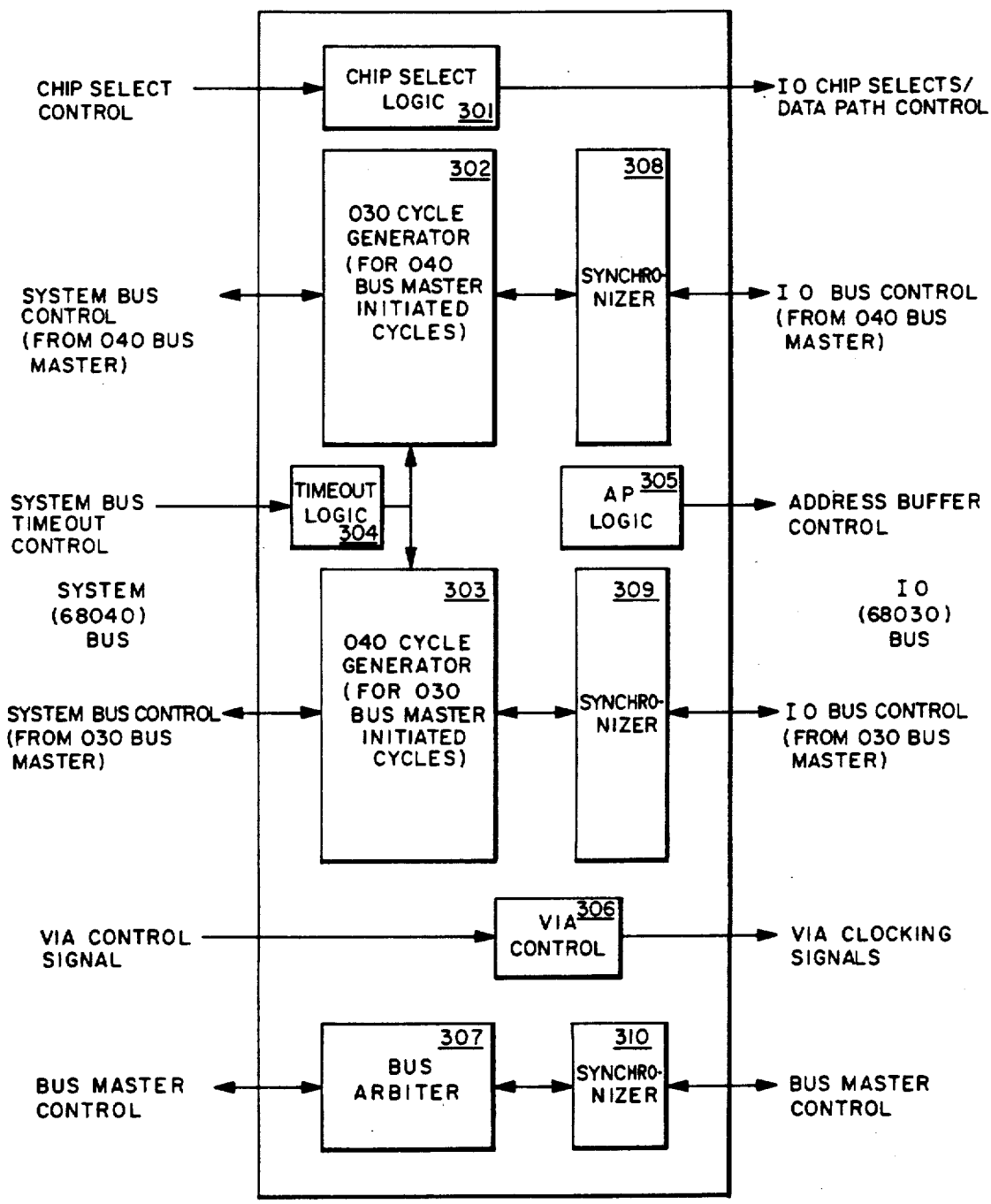
FIG_3

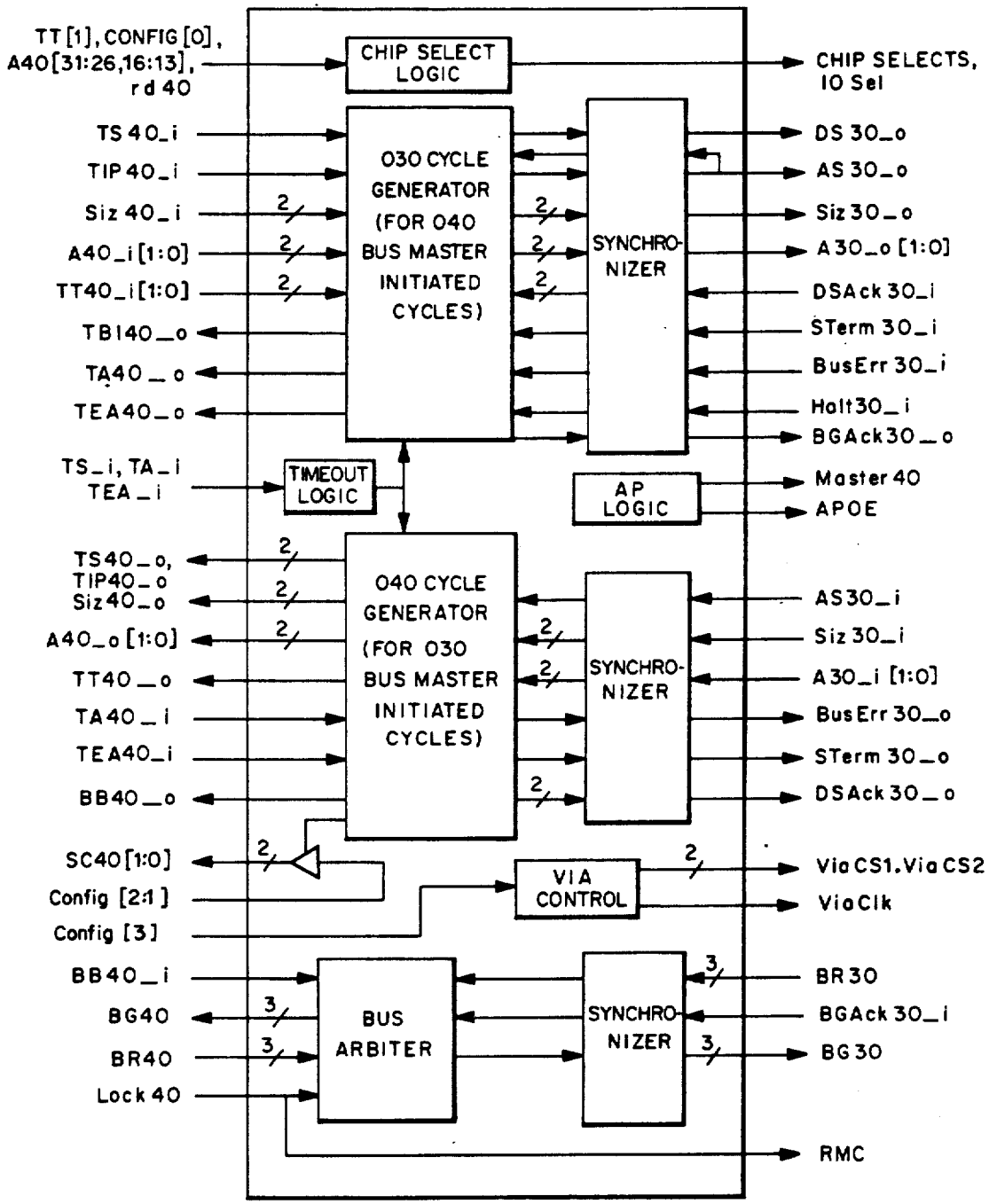
FIG_4

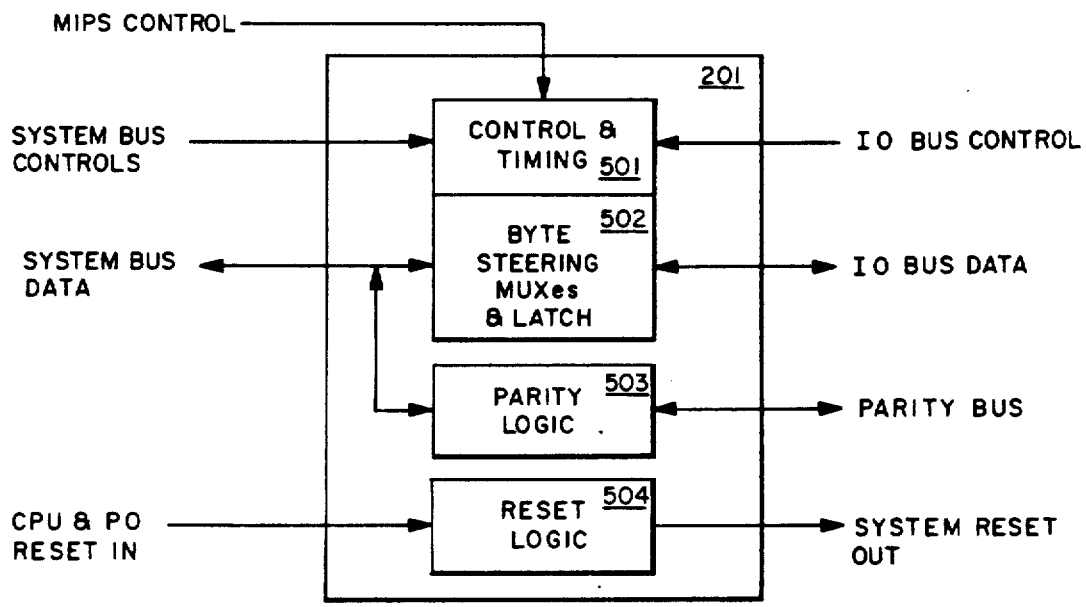
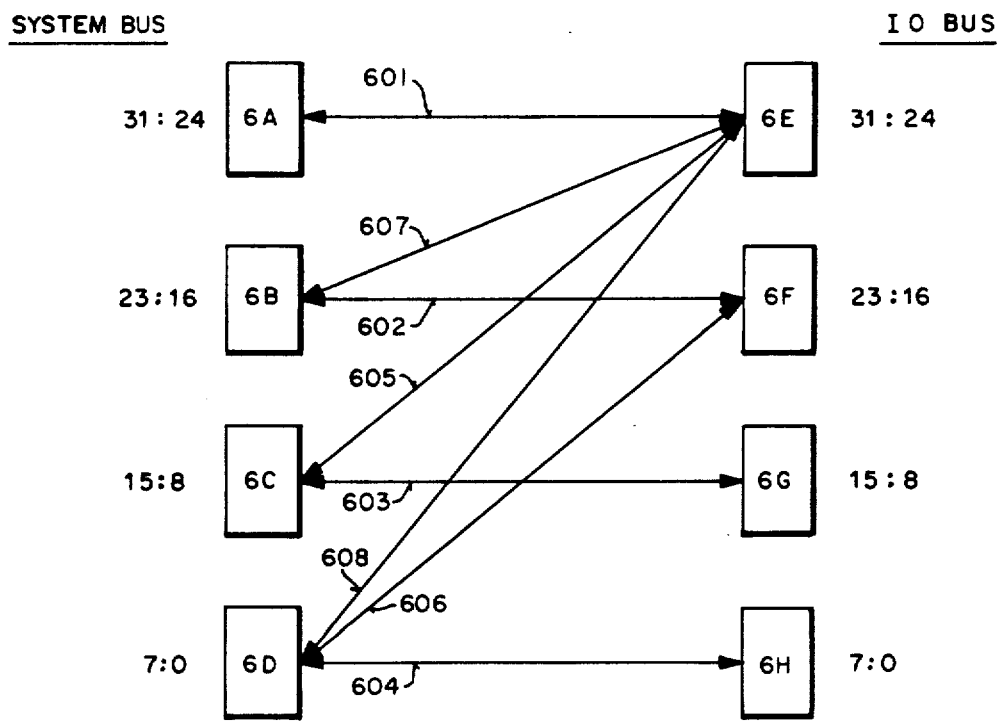

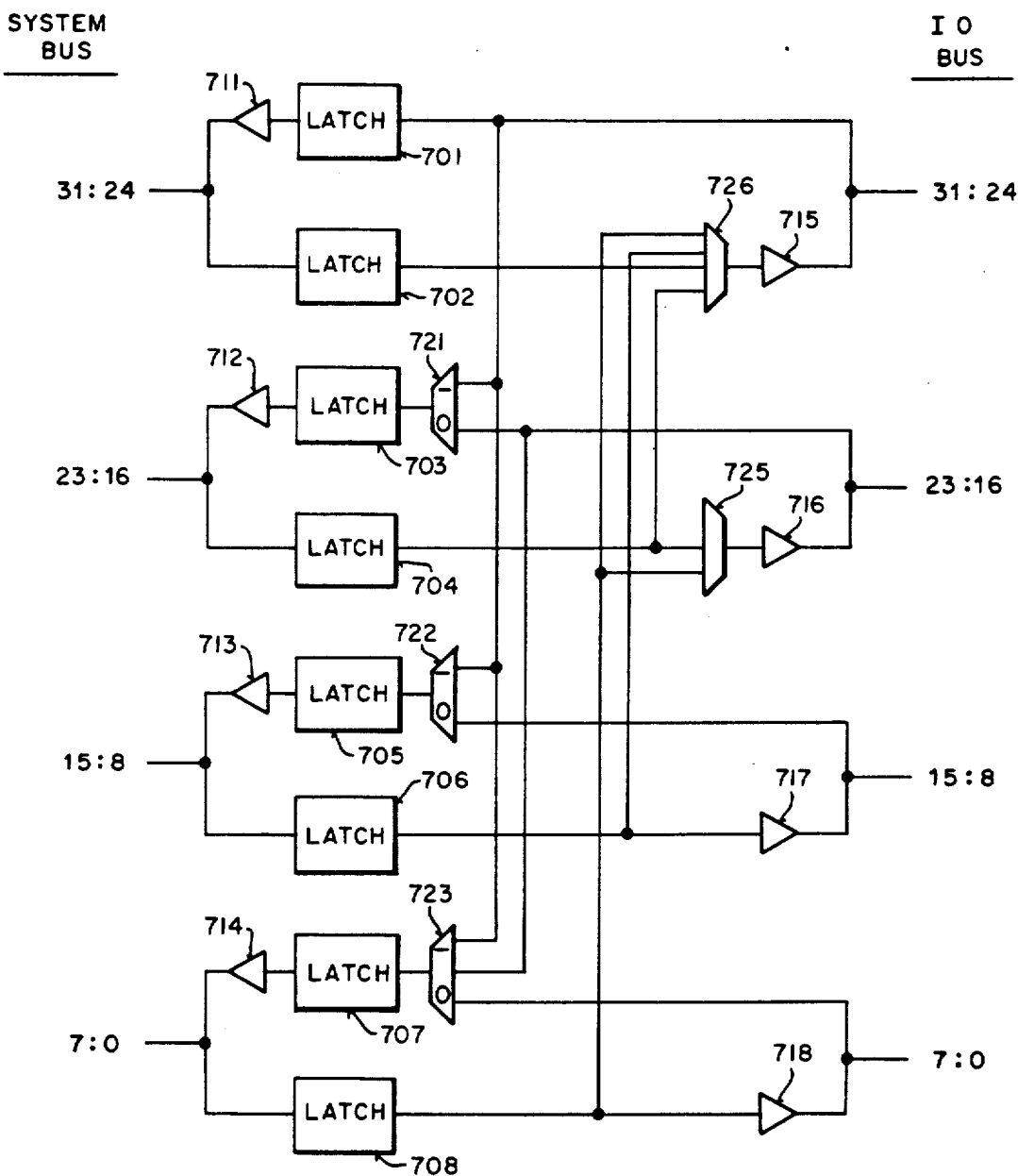
FIG_7

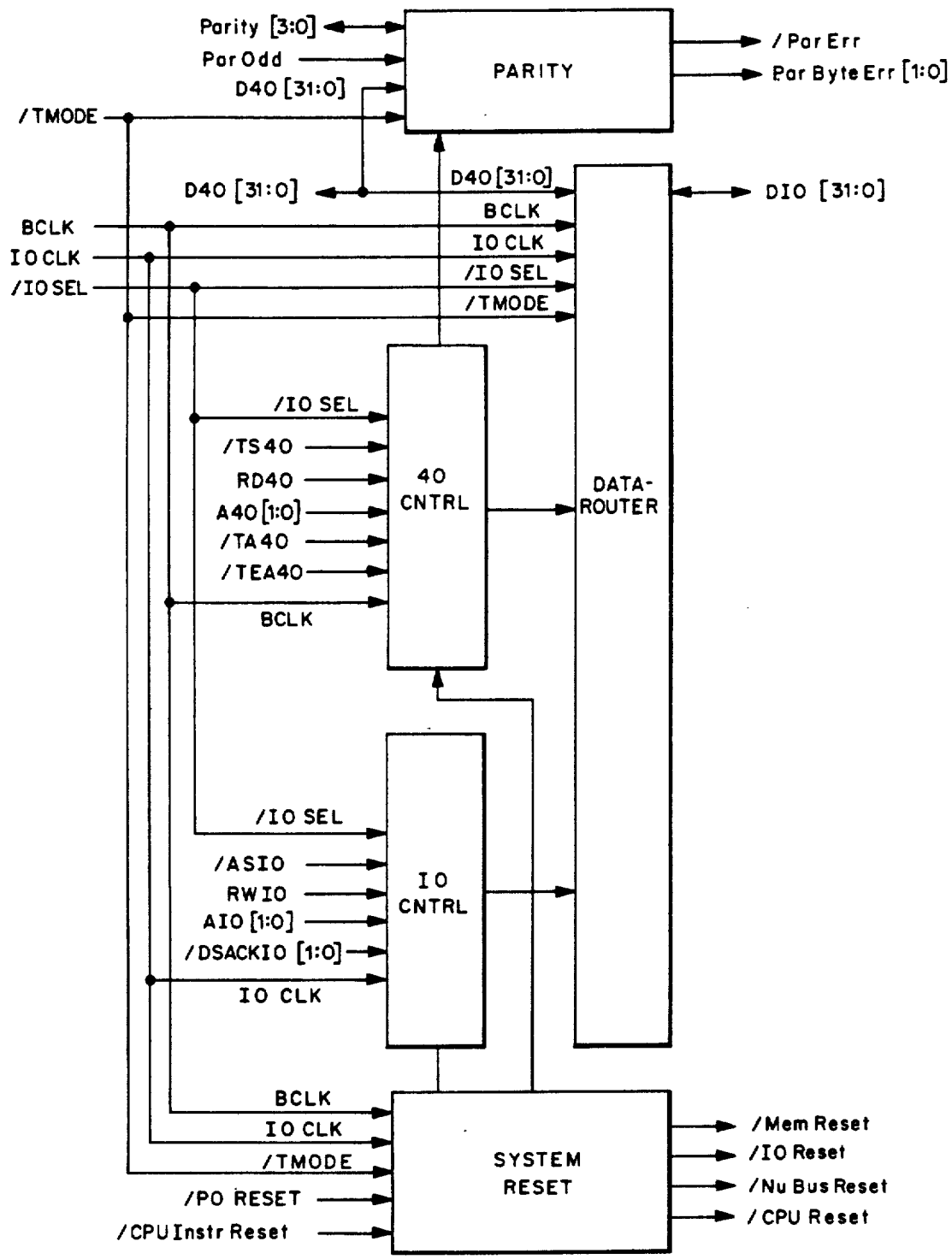
FIG_8

IO ADAPTER FOR SYSTEM AND IO BUSES HAVING DIFFERENT PROTOCOLS AND SPEEDS

FIELD OF THE INVENTION

The present invention relates to mechanisms and methods for transfering data between data processing devices and, more particularly, for transfering data between devices on two different buses.

BACKGROUND OF THE INVENTION

In the computing industry, it is quite common to transfer data and commands between a plurality of data processing devices, such as for example, computers, printers, memories and the like, across a system or data bus. The usual bus archetecture includes both a parallel and serial bus which interconnects data processing units and peripheral devices to permit the exchange of data and messages at high speed.

The typical system or data bus is defined by the hardware characteristics under which it operates. These hardware requirements are generally referred to as the bus protocol. The protocols influence both the mode and manner of data transfer on the bus. The protocol is usually dictated by the microprocessor attached to the bus. Thus, all data processing devices coupled to the bus are designed to utilize the bus protocol of the microprocessor in the computer system. For example, all data transfers in a computer system utilizing Motorola's 68030 or 68040 microprocessor occur using the bus protocol of the 68030 to 68040 respectively.

Problems arise where data transfering devices designed to operate under one such protocol are needed or desired in a computer system operating with a different protocol. For instance, where certain application specific computer chips are designed to operate in a 68030-based computer system, the chips could not be used in a 68040-based system. The 68040 bus is quite different than the bus defined for the 68030. Differences between the two buses involve the manner in which data is transfered in both size and byte alignment. Furthermore, differences in the clock speeds at which the buses operate also prevent devices designed for use in one system to be used in another.

The present invention provides a bus adapter which allows data transfering devices on one bus utilizing one protocol to be used in a computer system employing a different protocol. The bus adapter of the present invention couples two buses operating at different speeds and aligns data to accommodate devices of a varying data specifications. Specifically, the present invention provides a transparent window between the two buses operating at different speeds and using different protocols, so that the devices may operate with one another.

SUMMARY OF THE INVENTION

A bi-directional bus adapter coupling a system bus, which operates at a first speed using a first protocol, and an IO bus, which operates at a second speed using a second protocol, and allowing data transfering devices on either bus to transfer data to or from devices on the other bus is described. The bus adapter includes an arbitration mechanism to determine which of the data transfering devices can use buses at any time. Furthermore, the bus adapter includes a cycle generation mechanism which is responsive data cycles from one of the buses in order to generate bus cycles needed to complete a data transfer to a device on the other bus. A synchronization mechanism is coupled to the cycle generation mechanism for converting the plurality of data cycles generated by the cycle generation mechanism from either the first speed to the second speed or vice versa.

The bus adapter includes bi-directional data path mechanism for routing data between the system and IO buses according to said protocols, such that the data path directs bytes of data to specific data lines to perform byte steering and dynamic bus sizing on the data from the system bus to the IO bus. The bus adapter also includes a bi-directional address transceiver mechanism for routing addresses between said system and said IO buses.

The bus adapter further includes timeout logic for terminating data cycles from one of the devices assuming ownership of the buses which counts bus clock cycles to a predetermined number and generates a bus error where the data cycles are not acknowledge by the time the timeout logic counts to the predetermined number.

BRIEF DESCRIPTION OF DRAWINGS

FIG. 1 is an illustration of the computer system architecture of the present invention.

FIG. 2 is an illustration of the currently preferred embodiment of the IO adapter of the present invention.

FIG. 3 is an illustration of the control path for the IO adapter of the present invention.

FIG. 4 is an illustration of the preferred embodiment of the control path for the IO adapter of the present invention.

FIG. 5 is an illustration of the data path for the IO adapter of the present invention.

FIG. 6 is an illustration of the data byte routing paths for the data path of the present invention.

FIG. 7 is an illustration of the implementation of the data byte routing paths in the data path of the present invention.

FIG. 8 is an illustration of the preferred embodiment of the data path for the IO adapter of the present invention.

DETAILED DESCRIPTION OF THE PRESENT INVENTION

A bi-directional bus adapter coupling a system bus, which operates at a first speed using a first protocol, and an IO bus, which operates at a second speed using a second protocol, and allowing data transfering devices on either bus to transfer data to or from devices on the other bus is described. In the following description, numerous specific details are set forth such as specific computer components, bit lengths, etc., in order to provide a thorough understanding of the present invention. It will be obvious, however, to one skilled in the art that the present invention may be practiced without these specific details. In other instances, well-known components, structures and techniques have not been shown in detail to avoid unnecessarily obscuring the present invention.

Computer System Overview

Referring to FIG. 1, an overview of the computer system of the present invention is shown in block diagram format. It will be understood that while FIG. 1 is useful for providing an overall description of the computer system of the present invention, a number of details of the system are not shown. As necessary for disclosure of the present invention, further detail is set forth with reference to other figures provided with this specification. Further, the present invention is described with reference to its preferred embodiment; alternative embodiments which may be conceived by one of ordinary skill in the art are considered within the scope of the claims set forth below.

The computer system of FIG. 1 comprises a microprocessor 101 which, in the currently preferred embodiment, is a Motorola part no. 68040. Hereinafter, microprocessor 101 will be referred to as the "68040." The 68040 operates at a clock speed of either 25 or 33 MHz. The 68040 is coupled to a system bus 102. System bus 102, which runs at the same clock speed as the 68040, couples data processing devices together. Often these data processing devices are referred to as bus masters and slave devices depending on which device is controlling the data transfer. A bus master can gain control of system bus 102 and IO bus 110 in order to transfer data. In the currently preferred embodiment, system bus 102 supports up to three alternative bus masters, but only the 68040 or a device on NuBus can be bus masters on system bus 102. A read-only memory (ROM) 105 is coupled to system bus 102 for storing static information and instructions for the 68040. Read-only memory 105 can range in size from 1 to 4 megabytes (MB). A dynamic random access memory (DRAM) 104, commonly referred to as main memory, is coupled, via memory controller 103, to system bus 102 for storing information and instructions for the 68040 and alternative bus masters. Memory controller 103 provides control and timing signals which control access to both system ROM 105 and main memory 104. NuBus controller 106 couples the 68040 to a NuBus IO bus, via system bus 102. NuBus controller 106 creates a bus window which maps certain system bus cycles of system bus 102 to NuBus cycles and vice versa. All of these devices coupled to system bus 102 utilize the hardware protocol of the 68040. Other hardware devices may be coupled to system bus 102, but are restricted to using the system bus protocol.

The computer system of the currently preferred embodiment also includes an IO bus 110 for coupling bus masters and slave devices on IO bus 110 to system bus 102. In the currently preferred embodiment, IO bus 110 supports up to three alternative bus masters which can access system bus 102 to exchange data with main memory 104. IO bus 110 does not contain a microprocessor. Even so, IO bus 110 hardware protocols are a subset of the bus protocols for Motorola's 68030 microprocessor. The bus clock for IO bus 110 is completely asynchronous to the system bus clock for system bus 102. IO bus 110 operates at either 15.6672 or 24.28416 MHz. The devices coupled to IO bus 110 includes an ethernet control chip 111 as the only IO bus masters. Ethernet control chip 111 controls the ethernet local-area network being served by computer system 100. SCSI block 112 act as a slave device for SCSI operations. Also coupled to IO bus 110 is a floppy disk drive 113 for IO accesses to main memory 104. One of the slave devices coupled to IO bus 110 is sound chip 114. All of the attached hardware devices utilize the hardware bus protocols of a 68030 microprocessor. Other devices may be coupled to IO bus 110, but are restricted to using the IO bus protocol.

IO bus adapter (IOA) 120 provides a bidirectional bus coupler or bus window, which transparently couples system bus 102 and IO bus 110. IOA 120 allows bus master devices on system bus 102 to request bus access and transfer data to slave devices located on either system bus 102 or IO bus 110. IOA 120 also allows IO bus master devices to access main memory 104 which is located on system bus 102. A diagram of IOA 120 is depicted in FIG. 2.

Overview of the Bus Adapter

FIG. 2 shows IOA 120 in block diagram format. In the currently preferred embodiment, IOA 120 comprises a pair of ASICs (Application Specific Integrated Circuits). IOA 120 allows data transfers to occur transparently between IO bus 110 devices (peripherals and bus masters) and system bus 102 devices (peripherals, bus masters, and main memory 104), even though IO bus 110 operates on 68030 protocols and system bus 102 operates on 68040 protocols. The purpose of IOA 120 is to allow a 68040-based computer system 100 to use all of the peripheral chips that are currently being used in 68030 machines. Because of the difference in protocols, the IO bus 110 chips will not work on system bus 102.

In the currently preferred embodiment, IOA 120 is divided into a control path chip including arbitration logic (which is not shown), a data path chip, and and address bus transceivers chips. The control chip includes control path 202 which includes arbitration logic, and the data path chip consists of data path 201. The address bus transceivers chips consist of address bus transceivers 203. Referring to FIG. 2, control path 202 of IOA 120 accepts IO bus signals on one side and system bus signals on the other side, and translates between the two. The translation makes system bus 102 and IO bus 110 operate together as one bus. System bus 102 and IO bus 110 are asynchronous, with IO bus 110 running at a lower speed than system bus 102. The acrhitecture of IO bus 110 supports system bust access to IO peripherals and IO bus master access to main memory 104 on system bus 102. IOA 120 also supports an ethernet local area network on IO bus 110 and does bus arbitration for control of IO bus 110 and system bus 102. However, IOA 120 does not allow IO bus masters to access IO bus peripherals.

IOA 120 comprises data path 201, control path 202 and address transceivers 203. Data path 201 implements buffering for the data bus and performs data routing, as well as reset synchronization and distribution. The functions of parity checking and generation are also performed by data path 201. Data path 201 is discussed latter in conjunction with FIGS. 5-8. Control path 202 handles the chip selects and the acknowledge signals for IO bus 110 slave devices. Control path 202 is also responsible for conversion of timing signals between buses and for control of the external address bus transceivers. Bus arbitration, timeout generation and VIA clock generation are implemented by control path 202 as well. Control path 202 is discussed in more detail below in conjunction with FIGS. 4 and 5. Address bus transceivers 203 coordinate the address bus between the two buses.

Overview of the Control Path

The main purposes of control path 202 are to translate bus control signal protocols and to generate extra bus cycles when necessary to successfully complete a data transfer. This occurs when the 68040 accesses a slave device on IO bus 110 and when an IO bus master accesses main memory 104.

The 68040 does not implement unaligned data transfers or dynamic bus sizing. If software operating within computer system 100 requests an unaligned bus transfer, the 68040 performs multiple aligned bus transactions until all the requested data is transferred, transparent to control path 202. However, if an IO bus master attempts an unaligned transfer to or from main memory 104, control path 202 divides the transfer into multiple aligned cycles for system bus 102. When such a transfer is requested by an IO bus master, system bus 102 views multiple control signals indicating the start of a transfer followed by the acknowledgement before control path 202 generates a termination signal to IO bus 110. Then, data path 201 supplies IO bus 110 with the data in the requisite format.

The 68040 does not implement dynamic bus sizing. It expects all slave devices to have 32 bit wide data ports. Even if the request is for a single byte, the 68040 expects the byte to be presented on the correct byte lane. Control path 202, in conjunction with data path 201, implements dynamic bus sizing, whenever a request from the 68040 to a slave device on IO bus 110 must be divided into multiple IO bus cycles. When control path 202 needs to generate extra IO bus cycles, control path 202 sends a control signal to strobe IO bus 110 until the transfer is completed. Then control path 202 generates a control signal acknowledging the transfer on system bus 102.

FIG. 3 illustrates control path 202 in block diagram format.

The Chip Select Logic

All data transferring devices on IO bus 110 have chip selects. Chip select logic 301 generates all the chip selects required by devices on IO bus 110 after the 68040 gains access to IO bus 110. In addition, chip select logic generates the register chip select for NuBus controller 106 on system bus 102. Chip select logic 301 also generates an IO select control signal, IOSel, during a bus transfer. The IOSel signal is used to indicate to data path 201 that a bus transfer is from system bus 102 to IO bus 110. Furthermore, the IOSel signal is used internally by control path 202 to signal cycle generator 302 to begin a cycle.

The 030 Cycle Generator

Cycle generator 302 causes bus cycles to be generated on IO bus 110 in response to some requests to IO or NuBus space by a bus master on system bus 102. Cycle generator 302 generates the bus cycles in response to a control signal indicating the start of a transfer, which is latched from system bus 102. Chip select logic 301 asserts an IOSel signal and then cycle generator 302 runs a bus cycle to IO bus 110. Since cycle generator 302 operates at the clock frequency of system bus 102, the bus cycles are synchronized to the bus clock of IO bus 110 in synchronizer 308.

Once operating, cycle generator 302 waits for signal indicating a cycle termination. The cycle termination may come from IO bus 110 or from timeout logic 304 of control path 202. The termination signals from IO bus 110 are synchronized by synchronizer 308 to the bus clock of system bus 102 and fed into cycle generator 302. During operation, cycle generator 302 generates up to four IO bus cycles for a single processor bus request. When the data transfer has been completed, cycle generator 302 issues a signal to system bus 102 acknowledging the transfer.

If an internal timeout is received before any other type of termination, cycle generator 302 completes the bus cycle by asserting an error signal on IO bus 110 and a transfer error acknowledge signal on system bus 102. Afterwards, cycle generator 302 returns to its idle state.

If a timeout is received simultaneously with another termination from IO bus 110, the other termination takes precedence and the timeout is ignored. If a normal and an error termination are received through synchronizer 308 simultaneously, cycle generator 302 responds to the error termination.

The 040 Cycle Generator

Cycle generator 303 is similar in function to cycle generator 302. Cycle generator 303 causes bus cycles, which are 68040-based, to be generated on system bus 102 in response to some transfer request by an IO bus master to a system bus slave device. When a bus master on IO bus 110 begins a transfer, synchronizer 309 synchronizes the signals to the clock speed of control path 202. The first cycle may require some translation of the address bits 1 and 0 and the size bits to determine the size of the transfer and the corresponding address offset of the transfer. This translation is required when an IO bus master requests a cycle not supported on system bus 102, such as an unaligned transfer. Once start up has begun, cycle generator 303 waits for a cycle termination signal on system bus 102 by either a transfer acknowledge signal or transfer error acknowledge signal, or an internal time-out. If control path 202 is terminated by a transfer acknowledge signal, and if the bus cycle on system bus 102 was the first required to fulfill the request of IO bus 110, control path 202 asserts control signals on IO bus 110 to determine if more bus cycles are required to complete the transfer.

If control path 202 is terminated by a signal acknowledging the completion of the transfer, control path 202 immediately asserts a signal indicating a bus error signal on IO bus 110 and does not runs more bus cycles on system bus 102 for that IO bus transaction. Control path 202 does not have the capability to respond to retry terminations, such as a transfer acknowledge signal and a transfer error acknowledge signal on system bus 102. Control path 202 views a bus retry on system bus 102 as only a transfer error acknowledge.

If the internal timeout is seen before either a transfer acknowledge signal or transfer error acknowledge signal, then cycle generator 303 terminates the transfer with a bus error signal on IO bus 110 or a transfer error acknowledge signal on system bus 102. If cycle generator 303 sees the internal timeout signal simultaneously with a transfer acknowledge and/or transfer error acknowledge signal, then the timeout signal is ignored.

Any device on IO bus 110 with an 8-bit internal data-bus (e.g., Sound chip 114 and VIA chips (not shown)) does not generate any cycle termination. Thus, control path 202 generates the acknowledge signals for these devices at the proper times.

Cycle generator 303 also generates an output enable for the signals it sources on IO bus 110 and system bus 102.

Timeout Logic

Timeout logic 304 consists of a counter that starts from state O each time a transfer start signal is asserted by either control path 202 or one of the masters on system bus 102. Since all masters on IO bus 110 go to system bus 102 for their bus transactions, the timeout counter is triggered by all IO bus masters as well. The counter continues incrementing until either a transfer acknowledge signal, transfer error acknowledge signal, or both are seen by control path 202. However, if none of these events occurs within 512 bus clock cycles after the transfer start signal, then a timeout occurs.

A timeout results in control path 202 issuing a transfer error acknowledge signal on system bus 102 and a transfer error acknowledge on IO bus 110. If control path 202 was a bus master on either bus when the timeout occured, then it considers the cycle it was running as completed and both cycle generators 302 and 303 return to their idle states. The timeout counter is reset to zero after a timeout and after every bus cycle termination, and is ready to be restarted by the next transfer start signal.

A fixed period of 512 bus clock cycles for the timeout interval implies that the absolute timeout period depends on the clock frequency of system bus 102, as summarized below:

25 MHz bus clock 43 20.48 uS timeout period
33 MHz bus clock→15.50 uS timeout period
40 MHz bus clock→12.80 uS timeout period The timeout counter is not be started when a transfer start signal is seen along with a NuBus address. This allows NuBus to have its own, longer, timeout period. Upon assertion of chip reset, the timeout counter returns to state O. Since the timeout counter consists of several stage of cascaded logic, reset should be asserted for at least 15 bus clock cycles. This allows time for reset synchronization and reset of timeout counter logic 304.

AP Logic

AP logic 305 generates the control signals for the bidirectional address buffers which route addresses between IO bus 110 and system bus 102. In the currently preferred embodiment, two control signals are generated. One signal controls the direction of the address buffers. The signal is in normal high-low format. A low value indicates that a device on system bus 102 is master, and that the address should be sent from system bus 102 to IO bus 110. A high value on this signal indicates that a device on IO bus 110 is master, and that addresses should be routed from IO bus 110 to system bus 102.

Another signal controls the buffers' output enables. When this signal is low, it enables the outputs of the address buffers.

Via Control

VIA chips in computer system 100 (not shown) have some special timing requirements. They involve real-time activities, such as interfacing to the clock and sound chip 114. To accommodate these real-time activities, the VIA chips require a specific clock frequency of 15.6672/20 Mhz. Also, the VIA chip selects are special, and require a specific relationship to the VIA clock. In addition, the data acknowledge control signal for the VIAs, which is generated by control path 202, also requires a specific relationship to the VIA clock. This is all coordinated by the VIA control logic.

VIA control logic 306 selects whether the VIA control signals derive their timing from operating IO bus 110 at either 15.6672 MHz or 24.28416 MHz. For a 15.6672 MHz IO bus clock, VIA control logic 306 generates a VIA clock with a frequency equal to IO bus clock divided by 20. For a 24.28416 MHz IO bus clock, VIA control logic divides the IO bus clock by a factor of 31 to generate the VIA clock.

The Arbiter

Bus arbiter 307 operates independent of cycle generators 302 and 303. In the currently preferred embodiment, arbiter 307 arbitrates control of system bus 102 and IO bus 110 for up to six alternate bus masters, three bus masters on IO bus 110 and three bus masters on system bus 102. (Hereinafter, system bus 102 and IO bus 110 when considered as one singular bus will be referred to as the "whole" bus.) Arbiter 307 supports protocols for devices on both system bus 102 and IO bus 110. Of the six masters, only one retains ownership of the whole bus at any given time.

Bus arbiter 307 grants ownership of the whole bus according to a fixed, predetermined priority. Of the devices being sampled in any individual arbitration contest, arbiter 307 grants ownership of the whole bus to the device with the highest priority. In the currently preferred environment, the devices on IO bus 110 have higher priorities than the devices on system bus 102. In the currently preferred embodiment, ethernet 111 has the highest priority IO bus 110 provides two bus masters spares (not shown) which can be used to add two more bus·masters. The priorities of two devices for the space locations are the second and third highest priorities behind ethernet 111 if such devices are attached to IO bus 110. In the currently preferred embodiment, NuBus is the device with the next highest priority. The 68040 has the lowest priority.

Arbiter 307 implements a limited amount of fairness to prevent one of the devices on system bus 102 from "hogging" the whole bus and preventing a lower priority device on system bus 102 access to the whole bus. When a device on system bus 102 has taken control of the whole bus, arbiter 307 allows the device on system bus 102 to keep its bus request asserted so that the device can retain the whole bus for multiple bus accesses. Once the device has assumed control of the whole bus, arbiter 307 runs the arbitration contest, except when the device currently owning the whole bus is engaged in locked transfers (discussed below). The bus request from the device which currently controls, the whole bus is not included in the arbitration contest. Thus, if a device with a lower priority is requesting the whole bus, and no requests from higher priority devices are asserted, arbiter 307 allows the lower priority device to access the whole bus.

In order to allow the lower priority device access to the whole bus, arbiter 307 negates the bus grant of the device on system bus 102 which currently assumes the whole bus and grants a bus grant to the next device. When the current bus owner sees its bus grant negated, it relinquishes the whole bus after completing a finite number of cycles. This number of cycles varies and always depends on the device. If the device surrendering the whole bus has additional cycles to perform, it keeps its bus request asserted so that the device may gain access to the whole bus by winning a future arbitration contest. The device that now has a bus grant assumes the whole bus.

Devices on system bus 102 are allowed to "park" on the whole bus. When one of these devices has been granted control of the whole bus and no longer needs it, the device negates its bus request, but continues to assert a bus busy signal. In this manner, the system bus device retains ownership of the whole bus. By parking on the whole bus, the system bus device does not need to re-arbitrate for ownership of the whole bus when it requires its use. The device continues to assert a bus busy signal until arbiter 307 negates the bus grant to the device. When any alternative bus master asserts a bus request and one of the devices on system bus 102 has ownership of the whole bus, arbiter 307 negates the bus grant to the device and grants ownership of the whole bus to the requesting bus master with the highest priority.

Arbiter 307 does not negate the bus grant to a device on system bus 102 when the device is conducting a locked transfer because arbiter 307 enforces the locked protocol for devices on system bus 102. Locked transfers include indivisible read-modify-write transactions. Therefore, when any of the devices on system bus 102 assert a lock signal, the system bus device indicates to arbiter 307 that the current cycle is indivisible. When the lock signal is asserted, arbiter 307 does not run the arbitration contest. This is true even after the system bus device asserting the lock signal has assumed control of the whole bus. Only after the lock signal is negated will arbiter 307 run an arbitration contest.

If the locked transfer is terminated, arbiter 307 negates the bus grant to the current device and transitions to the idle state to run the arbitration contest. Once a locked transfer is terminated, a retry signal is produced. Due to the slowness of arbiter 307 in removing the bus grant, the current device re-runs the cycle when a retry is indicated and again receives the retry. When the device attempts to rerun its cycle, it relinquishes ownership of the whole bus because its bus grant was negated. The alternate bus master that won the arbitration contest then assumes control of the whole bus. After the alternate bus master finishes its cycle, the device which had its bus grant negated can retry and should be able to complete the last cycle.

Arbiter 307 allow arbitration cycles to overlap data transfer cycles. When a device has fully assumed control of the whole bus, the arbitration contest is run and the whole bus granted to the next device. This overlapped operation does not occur when one of the devices on system bus 102 is performing locked transactions, when the whole bus has been idle, or when a device on system bus 102 has been parked on the whole bus. During a locked transaction, arbiter 307 does not run the contest until the signal, which indicates a locked transaction, is negated or a retry occurs (as discussed above).

Operation of the Arbiter

Arbiter 307 powers up and returns from any reset in the idle state. Arbiter 307 runs the arbitration contest in the idle state. The internal circuitry is synchronous to the clock of system bus 102. All asynchronous signals are doubled rank synchronized to the system bus clock. All bus grant outputs of devices on system bus 102 are asserted synchronously to the system bus clock. All but grant outputs from devices on IO bus 110 are double rank synchronized to the IO bus clock by synchronizer 310. Due to the effect of the synchronizers for the IO bus devices, it is possible to have two bus grants asserted simultaneously. This occurs when a bus grant to a device on IO bus 110 is negated and a bus grant to a device on system bus 102 is asserted because of the delay through synchronizer 310. Operation of computer system 100 remains unaffected since this occurs only when negating a bus grant to a device on IO bus 110 which does not relinquish ownership of the whole bus until it has completed the current transfer. Once the device on IO bus 110 relinquishes the whole bus, the control signal generated by the device indicating that IO bus 110 is busy is negated. After a synchronization delay occurs when negating the bus busy control signal, the device on system bus 102 assumes control of the whole bus.

Arbiter 307 samples bus request from the alternate bus master devices installed in computer system 100 and asserts bus grants to the devices based on the assigned priority. Arbiter 307 enforces the protocols of devices on system bus 102 and IO bus 110 to insure that contention for ownership of the whole bus never occurs. Therefore, arbiter 307 insures that only one device assumes control of the whole bus at any one time by accounting for the synchronization delays that are incurred between system bus 102 and IO bus 110.

When arbiter 307 grants the whole bus to one of the devices on system bus 102, it waits until the devices on IO bus 110 see the acknowledge signal from the system bus device before running the arbitration contest and granting the bus to the next device. When arbiter 307 grants control of the whole bus to one of the devices on IO bus 110, it waits until the devices on system bus 102 see the acknowledge signal from the IO bus device before running the arbitration contest and granting ownership of the whole bus to the next device. In order to insure that the device that currently has the bus grant is the device that has asserted the acknowledge signal, arbiter 307 requires that the acknowledge signal be negated and then asserted.

When one of the devices on system bus 102 requests the whole bus, arbiter 307 grants the whole bus to the system bus device, according to priority, and waits until the previous device, if not previously in the idle state, has relinquished control of the whole bus. Then arbiter 307 waits until the device on system bus 102 that has received the bus grant fully assumes ownership of the whole bus. As this point, assuming the system bus device is not performing a locked transaction, arbiter 307 runs the arbitration contest. The request from the device that currently has assumed ownership of the whole bus is omitted from the arbitration contest to prevent bus hogging by a high priority device on system bus 102. If another device is requesting control the whole bus, arbiter 307 negates the grant to the current system bus device and asserts the bus grant to the next device. If no other requests are pending, arbiter 307 remains in the current state and continues to run the arbitration contest.

When one of the devices on IO bus 110 requests ownership of the whole bus, arbiter 307 grants the whole bus to the IO bus device, according to priority, and waits until the previous device, if any, has relinquished control of the whole bus. The arbiter 307 waits until the IO bus device that has received the bus grant fully assumes control of the whole bus. At this point, arbiter 307 runs another arbitration contest. The request from the device that currently has assumed the whole bus is omitted from the arbitration contest. If another device is requesting the whole bus, arbiter 307 negates the grant to the current IO bus device and grants ownership of the whole bus to the next device. If no other requests are pending and the current device still has its bus request asserted, arbiter 307 remains in the current state and continues to run the arbitration contest. If no other requests are pending and the current device has negated its bus request, arbiter 307 transitions to the idle state and runs the arbitration contest.

Currently Preferred Embodiment of the Control Path

The currently preferred embodiment of the control path 202 is shown in FIG. 4. For a signal which is an IO, the input component is shown in the diagram with a trailing "_i" in the signal name, and the output is named with a trailing "_o" in the signal name. FIG. 4 is a high level implementation of FIG. 3 denoting specific signals used in the currently preferred embodiment. A detailed explanation has been omitted because the specifics of its operation would be apparent to those skilled in the art.

Overview of the Data Path

Data on computer system 100 is divided into two buses: the system data bus and the IO data bus, which are each part of system bus 102 and IO bus 110 respectively. The main function of data path 201 is to route data bytes correctly in both directions between the system data bus portion of system bus 102 and the IO bus portion of IO bus 110. Data path 201 receives data from either the system data bus or the IO data bus and routes the data onto specifically defined byte lanes to the other bus with correct timing.

In the currently preferred embodiment, system bus 102, as mentioned above, is a 68040-based bus, while IO bus 110 is a 68030-based bus. The 68030 protocol allows 8-bit and 16-bit slave devices to attach to given byte lanes of the IO data bus and indicate their actual data bus size, or port, during the cycle acknowledge. Hardware inside the 68030 microprocessor performed the appropriate byte steering to send data over the correct byte lane. This allowed software to perform byte accesses of consecutive bytes. The 68040-based system bus 102, however, requires all data byte lanes on the system data bus to be placed as if all accesses were 32-bits long. In other words, the system data bus using the 68040 microprocessor expects accesses to 8-bit and 16-bit ports to be long word aligned. In order to maintain compatability between the 68030-based IO bus 110 and the 68040-based system bus 102, data path 201 provides the data byte routing for access to peripherals on IO bus 110 by the 68040.

Furthermore, the 68040 of the currently preferred embodiment does not support bus sizing. The 68040 expects accesses to 8-bit and 16-bit ports to be of the appropriate size. For instance, accesses to 8-bit ports would be a byte size access, and accesses to a 16-bit port would be word size access. A 68030-based computer system, however, allows 8 and 16-bit slave devices to attach to a given byte lane and indicate their port size during cycle acknowledge. Hardware in the 68030 performed the appropriate number and type of bus cycles to fulfill the request. Thus, software was allowed to do long word accesses to 8-bit devices without knowing the devices are 8-bit devices. In order to maintain compatability between the 68030-based IO bus 110 and the 68040-based system bus 102, data path 201 performs dynamic bus sizing for access to peripherals on IO bus 110 by the 68040.

Referring to FIG. 5, control/timing block 501 and byte steering block 502 accomplish the byte steering and dynamic bus sizing. Since the 68040 departs from the 68030 by requiring all data byte lanes to be placed as if all accesses were 32-bits long and does not perform dynamic bus sizing, control/timing block 501 and byte steering blcok 502 are used to join the 68040-based system bus 102 and the 68030-based IO bus 110 to create a transparent window between 68030-based devices on IO bus 110 and 68040-based devices on system bus 102.

Data path 201 also performs two other functions. Referring to FIG. 5, parity logic 503 implements byte-wide parity generation and error detection for accesses to main memory 104 (FIG. 1). Reset logic 504 provides computer system 100 with the required reset signals for system resets. A more thorough explanation of the three functions of data path 201 are discussed below.

Data Path Control

Data Path Control/Timing

Control/Timing block 501 and byte steering block 502 produce the data path control needed to accomplish the byte steering and data bus sizing. As discussed above, IO bus 110 may contain 8, 16, or 32-bit peripheral devices (slaves) and only 32-bit bus masters. These IO bus masters may initiate data transfers of 1, 2, 3 or 4 bytes, either aligned or unaligned. Burst transfers of 16 bytes are not supported by IO bus 110. If such a transfer is attempted, control path 202 changes the cycle request into one or more allowable system bus transfers, and data path 201 routes the data on specific byte lanes accordingly. System bus 102 contains only 32-bit bus masters and slaves. The 68040 microprocessor 101 of the currently preferred embodiment, only initiates transfers of 1, 2, 4 or 16 bytes. Control path 202 acknowledges the 16 byte transfer to IO bus 110 and causes it to be completed by the 68040 using four 4-byte bus transactions in long word format. Control path 202 changes the cycle requests from system bus 102, via the 68040, into one or more allowable IO bus transfers, and data path 201 routes the data on specific byte lanes.

To accomplish the data path control, control/timing block 501 received control signals from either system bus 102 or IO bus 110 and control signals from control path 202. In response, control/timing block 501 directs the routing of data being transferred through byte steering block 502.

IO Bus Master Initiates Cycles

In computer system 100, IO bus masters can produce bus cycles capable of transferring 1, 2, 3, or 4 bytes of data at any address offset, while the 68040-based devices require transfers to be 1, 2 or 4 bytes with 2-byte transfers being word aligned and 4-byte transfers being long word aligned. In other words, the 16-bit transfers only can occur with address offsets of 0 and 2, while 32-bit transfers can only occur with an address offset of 0.

Referring to Table 1, transfers by 32-bit bus masters on IO bus 110 to or from system bus 102 are described in more detail. The size and address offsets of the different transfers are listed under the Size and Addr columns respectively. The number of cycles required for any particular transfer is indicated by the number of lines required to describe the transfer. Note that the dash lines represent data which is of no importance. As shown, all single byte transfers to system bus 102 occur in one cycle. Two byte transfers from 32-bit IO bus masters are completed in the same number of cycles on system bus 102, except where the two byte transfer is at an address offset of 1. In this case, two cycles are required to complete the transfer on system bus 102. The extra cycle is required because the 68040-based system bus 102 only accepts two-byte transfers which are word aligned. Therefore, the two byte transfer can only occur at address offsets of 0 or 2, and not an address offset of 1, if the data is to be transferred in the same number of cycles.

TABLE 1

| 32-Bit IO Bus Master Transfers to/from System Bus | | | | | | | | | | |
|---|---|---|---|---|---|---|---|---|---|---|
| IO BUS (030) Transfer Requests | | | | | | System Bus (040) Cycles Required | | | | |
| Size | Addr | Byte Lanes | | | | Size | Addr | Byte Lanes | | |
| [1:0] | [1:0] | 31:24 | 23:16 | 15:8 | 7:0 | [1:0] | [1:0] | 31:24 | 23:16 | 15:8 | 7:0 |
| 1 Byte | 0 | OP3 | — | — | — | 1 Byte | 0 | OP3 | — | — | — |
|  | 1 | — | OP3 | — | — |  | 1 | — | OP3 | — | — |
|  | 2 | — | — | OP3 | — |  | 2 | — | — | OP3 | — |
|  | 3 | — | — | — | OP3 |  | 3 | — | — | — | OP3 |
| 2 Bytes | 0 | OP2 | OP3 | — | — | 2 Bytes | 0 | OP2 | OP3 | — | — |
|  | 1 | — | OP2 | OP3 | — | 1 Byte | 1 | — | OP2 | — | — |
|  |  | — | — | — | — | 1 Byte | 2 | — | — | OP3 | — |
|  | 2 | — | — | OP2 | OP3 | 2 Bytes | 2 | — | — | OP2 | OP3 |
|  | 3 | — | — | — | OP2 | 1 Byte | 3 | — | — | — | OP2 |
|  |  | OP3 | — | — | — | 1 Byte | 0 | OP3 | — | — | — |
| 3 Bytes | 0 | OP1 | OP2 | OP3 | — | 2 Bytes | 0 | OP1 | OP2 | — | — |
|  |  | — | — | — | — | 1 Byte | 2 | — | — | OP3 | — |
|  | 1 | — | OP1 | OP2 | OP3 | 1 Byte | 1 | — | OP1 | — | — |
|  |  | — | — | — | — | 2 Bytes | 2 | — | — | OP2 | OP3 |
|  | 2 | — | — | OP1 | OP2 | 2 Bytes | 2 | — | — | OP1 | OP2 |
|  |  | OP3 | — | — | — | 1 Byte | 0 | OP3 | — | — | — |
|  | 3 | — | — | — | OP1 | 1 Byte | 3 | — | — | — | OP1 |
|  |  | OP2 | OP3 | — | — | 2 Bytes | 0 | OP2 | OP3 | — | — |
| 4 Bytes | 0 | OP0 | OP1 | OP2 | OP3 | 4 Bytes | 0 | OP0 | OP1 | OP2 | OP3 |
|  | 1 | — | OP0 | OP1 | OP2 | 1 Byte | 1 | — | OP0 | — | — |
|  |  | — | — | — | — | 2 Bytes | 2 | — | — | OP1 | OP2 |
|  |  | OP3 | — | — | — | 1 Byte | 0 | OP3 | — | — | — |
|  | 2 | — | — | OP0 | OP1 | 2 Bytes | 2 | — | — | OP0 | OP1 |
|  |  | OP2 | OP3 | — | — | 2 Bytes | 0 | OP2 | OP3 | — | — |
|  | 3 | — | — | — | OP0 | 1 Byte | 3 | — | — | — | OP0 |
|  |  | OP1 | OP2 | OP3 | — | 2 Bytes | 0 | OP1 | OP2 | — | — |
|  |  | — | — | — | — | 1 Byte | 2 | — | — | OP3 | — |

With respect to three byte transfers from a 32-bit IO bus master, since the 68040-based system bus 102 does not accommodate three byte transfers, all of the transfers require extra cycles to complete. Note again that the transfers are divided at the address offsets corresponding to address offsets 0 and 2 to insure that the transfers are word aligned. As for four byte transfers, system bus 102 only accepts transfers which are long word aligned. Therefore, only the transfer at address offset of 0 is completed in the same number of cycles on system bus 102 as on IO bus 110. Note, though, that at address offsets of 1 and 3, the 32-bit IO bus master requires 2 cycles to transfer the four bytes, while system bus 102 requires 3 cycles (one extra cycle).

System Bus Master Initiated Cycles

Bus masters on system bus 102 produce bus cycles capable of transferring 1, 2 or 4 bytes of data at any address offset. Table 2 depicts the corresponding cycles required for a transfer involving an 8-bit IO slave device. Note that all of the data on IO bus 110 is in the highest order byte lane (31:24), regardless of the address offset. This is due to the 68030-based IO bus 110 requirement that 8-bit devices receive data only on one byte lane. Thus, all one byte transfers, regardless of their offsets, are transferred on the highest byte lanes of IO bus 110. It should be noted that two byte transfer require an extra cycle on IO bus 110 to perform the transfer. Four byte transfers to 8-bit slave devices on IO bus 110 also only receive data on the highest order byte lane. Therefore, four cycles are required to complete the transfer on IO bus 110 because on each successive cycle another byte is directed to the highest order byte lane.

TABLE 2

| System Bus Master Transfer to/from 8-Bit IO Bus Slave | | | | | | | | | | |
|---|---|---|---|---|---|---|---|---|---|---|
| System Bus (040) Transfer Requests | | | | | | IO Bus (030) Cycles Required | | | | |
| Size | Addr | Byte Lanes | | | | Size | Addr | Byte Lanes | | |
| [1:0] | [1:0] | 31:24 | 23:16 | 15:8 | 7:0 | [1:0] | [1:0] | 31:24 | 23:16 | 15:8 | 7:0 |
| 1 Byte | 0 | OP3 | — | — | — | 1 Byte | 1 | OP3 | — | — | — |
|  | 1 | — | OP3 | — | — | 1 Byte | 1 | OP3 | — | — | — |
|  | 2 | — | — | OP3 | — | 1 Byte | 2 | OP3 | — | — | — |
|  | 3 | — | — | — | OP3 | 1 Byte | 3 | OP3 | — | — | — |
| 2 Bytes | 0 | OP2 | OP3 | — | — | 1 Byte | 0 | OP2 | — | — | — |
|  |  | — | — | — | — | 1 Byte | 1 | OP3 | — | — | — |
|  | 2 | — | — | OP2 | OP3 | 1 Byte | 2 | OP2 | — | — | — |
|  |  | — | — | — | — | 1 Byte | 3 | OP3 | — | — | — |
| 4 Bytes | 0 | OP0 | OP1 | OP2 | OP3 | 1 Byte | 0 | OP0 | — | — | — |
|  |  | — | — | — | — | 1 Byte | 1 | OP1 | — | — | — |
|  |  | — | — | — | — | 1 Byte | 2 | OP2 | — | — | — |
|  |  | — | — | — | — | 1 Byte | 3 | OP3 | — | — | — |

Table 3 shows system bus master transfers to and from 16-bit slave devices on IO bus 110. It should be noted that the 16-bit devices only receive data on the two highest order byte lanes. All data in byte lanes 31:24 and 15:8 on system bus 102 are routed to and from the highest order byte lane 31:24 of the IO data bus of IO bus 110, while data on byte lanes 33:16 and 7:0 of system data bus of system bus 102 send and receive data through byte lane 23:16 of IO bus 110. It should be noted that one and two byte transfers require the same number of cycles to preform the transfere, while the four byte transfers require an extra cycle.

TABLE 3

| System Bus Master Transfers to/from 16-Bit IO Bus Slave | | | | | | | | | | | |
|---|---|---|---|---|---|---|---|---|---|---|---|
| System Bus (040) Transfer Requests | | | | | | IO Bus (030) Cycles Required | | | | | |
| Size | Addr | Byte Lanes | | | | Size | Addr | Byte Lanes | | | |
| [1:0] | [1:0] | 31:24 | 23:16 | 15:8 | 7:0 | [1:0] | [1:0] | 31:24 | 23:16 | 15:8 | 7:0 |
| 1 Byte | 0 | OP3 | — | — | — | 1 Byte | 0 | OP3 | — | — | — |
|  | 1 | — | OP3 | — | — | 1 Byte | 1 | — | OP3 | — | — |
|  | 2 | — | — | OP3 | — | 1 Byte | 2 | OP3 | — | — | — |
|  | 3 | — | — | — | OP3 | 1 Byte | 3 | — | OP3 | — | — |
| 2 Bytes | 0 | OP2 | OP3 | — | — | 2 Bytes | 0 | OP2 | OP3 | — | — |
|  | 2 | — | — | OP2 | OP3 | 2 Bytes | 2 | OP2 | OP3 | — | — |
| 4 Bytes | 0 | OP0 | OP1 | OP2 | OP3 | 2 Bytes | 0 | OP0 | OP1 | — | — |
|  |  | — | — | — | — | 2 Bytes | 2 | OP2 | OP3 | — | — |

Finally, Table 4 shows transfers for bus masters on system bus 102 to or from 32-bit slave devices on IO bus 110. Because both the bus master and slave devices are 32-bit devices, all transfer requests are completed in one cycle and without byte lane routing. In this case, only timing and protocol considerations are important.

TABLE 4

| System Bus Master Transfers to/from 32-Bit IO Bus Slave | | | | | | | | | | | |
|---|---|---|---|---|---|---|---|---|---|---|---|
| System Bus (040) Transfer Requests | | | | | | IO Bus (030) Cycles Required | | | | | |
| Size | Addr | Byte Lanes | | | | Size | Addr | Byte Lanes | | | |
| [1:0] | [1:0] | 31:24 | 23:16 | 15:8 | 7:0 | [1:0] | [1:0] | 31:24 | 23:16 | 15:8 | 7:0 |
| 1 Byte | 0 | OP3 | — | — | — | 1 Byte | 0 | OP3 | — | — | — |
|  | 1 | — | OP3 | — | — | 1 Byte | 1 | — | OP3 | — | — |
|  | 2 | — | — | OP3 | — | 1 Byte | 2 | — | — | OP3 | — |
|  | 3 | — | — | — | OP3 | 1 Byte | 3 | — | — | — | OP3 |
| 2 Bytes | 0 | OP2 | OP | — | — | 2 Bytes | 0 | OP2 | OP3 | — | — |
|  | 2 | — | — | OP2 | OP3 | 2 Bytes | 2 | — | — | OP2 | OP3 |
| 4 Bytes | 0 | OP0 | OP1 | OP2 | OP3 | 4 Bytes | 0 | OP0 | OP1 | OP2 | OP3 |

Data Transfer Implementation

In order to implement the data path routing and dynamic bus sizing, byte lanes couple specific bytes of system bus 102 with specific bytes of IO bus 110 as shown in FIG. 6. Referring to FIG. 6, byte lanes 601-604 are shown coupling the four bytes (32 bits) of the data bus 102 to their corresponding four bytes of the data bus of IO bus 110. These byte lanes are utilized when 32-bit bus masters on system bus 102 or IO bus 110 transfer data. In case of such a transfer, all four bytes remain on the same byte lanes between the two data buses.

Byte lanes 605 and 606, in conjunction with byte lanes 601 and 602 are used when a 16-bit device on IO bus 110 is involved in the transfer of data. If data is being transferred to the 16-bit IO bus device, two bytes of data from 6A and 6B are transferred to 6E and 6F respectively during the first cycle produced by cycle generator 302, using byte lanes 601 and 602 respectively. During a second cycle generated by cycle generator 302, bytes located in 6C and 6D are transferred to bytes 6E and 6F respectively, using byte lanes 605 and 606 respectively. Similarly, if data is being transferred from a 16-bit device on IO bus 110 to system bus 102, the same byte lanes are used. During a first cycle generated by cycle generator 303, bytes corresponding to bytes 6E and 6F of the IO data bus of IO bus 110 are transferred to bytes 6A and 6B respectively of the data bus of system bus 102, using byte lanes 601 and 602 respectively.

On a second cycle, a second set of bytes on 6E and 6F are transferred to bytes 6C and 6D respectively, using byte lanes 605 and 606 respectively. Then the four bytes are transferred to system bus 102 at once.

Referring to FIG. 6, byte lanes 601, 607, 605 and 608 are utilized for transfers involving an 8-bit device on IO bus 110. On transfers to an 8-bit device from system bus 102, the byte corresponding to byte 6A is transferred during the first cycle to byte 6E using byte lane 601. During the second cycle, the byte corresponding to byte 6B is transferred to byte 6E using byte lane 607. On the next cycle, the byte corresponding to 6C is transferred to byte 6E using byte lane 608. On the final cycle, the byte corresponding to byte 6D is transferred to byte 6E using byte lane 608. Similarly, if the transferred data is from an 8-bit device to system bus 102, in four successive cycles data is transferred from the byte corresponding to 6E to bytes 6A, 6B, 6C and 6D. Once all four transfers occur, the four bytes are transferred onto system bus 102.

The currently preferred embodiment of data byte router 502 is shown in FIG. 5 using latches 701-708, output enables 711-718, and multiplexers 721-725. FIG. 7 represents a high level implementation of FIG. 6. Using control signals generated in control/timing block 501, multiplexers 721-725 direct the routing of the data. A detailed explanation of the multiplexing, latching and output enabling has been omitted because the specifics would be obvious and known to those skilled in the art.

Parity Generation and Error Detection

Parity on computer system 100 is implemented by data path 201 in conjunction with memory controller 103 and main memory 104. Data path 201 performs fully combinational parity generation and checking. Parity generation is performed on write operations to main memory 104. Based on the system data bus of system bus 102 and a parity odd signal, data path 201 generates four parity bits, one per byte lane. These parity bits are stored in a predetermined portion of main memory 104 by memory controller 103.

Parity checking is performed on read operations from main memory 104. Data path 201 monitors the data bus of system bus 102, the parity bits and the parity odd signal to determine if a parity error has occurred. If a parity error has occurred, data path 201 generates a parity error signal and the appropriate byte lane descriptor identifying the specific unreliable data. In response, memory controller 103 terminates the cycle with a bus error signal and asserts a parity interrupt signal.

If a system bus master owns the whole bus when a parity error occurs, a transfer error acknowledge signal terminates the cycle. This allows software of computer system 100 to accommodate the error before using another cycle. If an IO bus master controls the whole bus when a parity error occurs, a transfer error acknowledge signal from memory controller 103 will be translated by control path 202 and sent to IO bus 110. This terminates the cycle allowing the data transfer to be halted.

System Reset Routing and Control

Referring to FIG. 5, reset logic 504 satisfies the various reset functions by providing separate resets to the CPU of the 68040, memory controller 103, IO space and NuBus space. The separate resets allow a quicker reset response for memory initialization and for the correct routing of a software originated reset signal. These two results occur upon power-up of computer system 100 and a CPU reset generation from a 68040 reset instruction execution.

During system power up, a PO reset signal input to reset logic 504 of the present invention is generated by analog circuitry external to data path 201. When the PO reset signal is asserted, reset logic 504 asserts four reset signals. Reset logic 504 asserts resets to the CPU of the 68040, a memory reset to memory controller 103, an IO space reset and a NuBus space reset to NuBus controller 106. When the PO reset signal is deasserted, reset logic 504 deasserts the memory reset and delays the deassertion of the other three reset signals until main memory 104 has completed initialization. Reset logic 504 produces the delay by starting a counter which counts to a predetermined number of clock cycles. The number of clock cycles is defined as the worst case delay in memory initialization. In the currently preferred embodiment, the delay is 3321 IO bus cycles. After the fixed length delay, reset logic 504 deasserts the remaining three reset signals to complete the reset of computer system 100.

When a reset instruction is executed by the CPU of the 68040 microprocessor, a CPU generated reset is asserted. When this occurs, reset logic 504 generates all of the same resets as asserted during power up, except the CPU reset signal. Reset logic 504 does not route a reset signal to the CPU. The same deassertion pattern and delay for the power up reset signals also occurs for the reset signals produced in response to the execution of the reset instruction by the CPU of the 68040.

Therefore, reset logic 504 provides separate resets to the CPU, memory controller 103, IO space and NuBus space at the power up of computer system 100 and the latter three resets when a reset signal is asserted as the result of a reset instruction execution by the CPU of the 68040.

Currently Preferred Embodiment of the Data Path

The currently preferred embodiment of data path 201 is shown in FIG. 8. Although FIG. 8 is a high level implementation of FIG. 5, a detailed explanation has been omitted because the specifics of its operation would be apparent to those skilled in the art.

Thus, A bi-directional bus adapter has been described which couples a system bus and an IO bus and allows data transfering devices on either bus to transfer data to or from devices on the other bus.

We claim:

1. A bi-directional bus adapter coupled between first and second buses, said buses consisting of data, address an control lines, said first and second buses containing a plurality of first and second data transferring devices, each generating a first plurality of data cycles designed to send and receive data according to a predetermined databus size, said first and second buses operating at first and second speeds respectively with first and second bus control protocols respectively, said first and second speeds and first and second bus control protocols being different, said bus adapter provided to allow said devices coupled to either of said buses to transfer data to other devices contained on the other of said buses, said bus adapter comprising:

arbitration means responsive to said plurality of data cycles from said devices, said arbitration means for determining ownership based upon priority of both said first and second buses by only one of said devices at any one time, wherein said arbitration means supports said first and second bus control protocols;

bus cycle generation means, responsive to said first plurality of data cycles from one of said devices on one of said buses, for generating a second plurality of data cycles necessary to complete said data transfer to one of said other devices on the other of said buses, such that the bus control protocols of each of said buses is supported during said data transfer;

synchronization means coupled to said bus cycle generation means for converting said second plurality of data cycles from either said first speed to said second speed or said second speed to said first speed;

bi-directional data path means coupled between said data bus of said first bus and said databus of said second bus and responsive to said first plurality of data cycles, said data path for performing data path routing between said first and second buses according to said bus control protocols; and bi-directional address transceiver means coupled between said databus of said first bus and said databus of said second bus and responsive to said first plurality of data cycles, said transceiver means for routing addresses between said first and said second buses, wherein devices on either of said buses transfer data to devices on the other of said buses according to their bus control protocols, such that said first and second buses operate as one single bus.

2. The bus adapter as in claim 1 wherein said adapter operates at said first speed.

3. The adapter as in claim 1 wherein said data path apparatus performs dynamic bus sizing of said data being transferred.

4. The bus adapter in claim 1 wherein said bus cycle generation means includes:
  first cycle generation means responsive to said plurality of data cycles from said system bus, said first cycle generation means for generating IO bus data cycles necessary to complete a data transfer to said IO bus;
  second cycle generation means responsive to said plurality of data cycles from said IO bus, said second cycle generation means for generating system bus data cycles necessary to complete a data transfer to said system bus.

5. The bus adapter as in claim 4 wherein said synchronization means includes:
  first synchronization means responsive to said plurality of data cycles from said first cycle generation means, said first synchronization means for converting said plurality of data cycles from said system bus speed to said IO bus speed;
  second synchronization means responsive to said plurality of data cycles from said second cycle generation means, said second synchronization means for converting said plurality of data cycles from said IO bus to said system bus speed.

6. A bi-directional bus adapter coupled between a system bus and an IO bus, said buses consisting of data, address and control lines, said system and IO buses containing a plurality of system and IO data transferring devices, each generating a first plurality of data cycles to send and receive data according to a predetermined databus size, said system and IO buses operating at system and IO speeds respectively with system and IO protocols respectively, said system and IO speeds and system and IO protocols being different, said bus adapter provided to allow said devices coupled to either of said buses to transfer data to devices contained on the other of said buses, said bus adapter comprising:
  arbitration means responsive to said plurality of data cycles from said devices, said arbitration means for determining ownership based upon priority of both said system and IO buses at any one time by only one of said devices, said arbitration means supporting said system and IO protocols;
  system cycle generation means responsive to said plurality of data cycles from said IO bus for generating system bus data cycles necessary to complete a data transfer to said system bus according to said system bus protocol;
  IO cycle generation means responsive to said plurality of data cycles from said system bus for generating IO bus data cycles necessary to complete a data transfer to said IO bus according to said IO bus protocol;
  system synchronization means responsive to said system bus data cycles from said system cycle generation means, said system synchronization means for converting said system bus data cycles generated by said system cycle generation means from said IO bus speed to said system bus speed;
  IO synchronization means responsive to said IO bus data cycles from said IO cycle generation means, said IO synchronization means for converting said IO bus data generated by said IO cycle generation means from said system bus speed to said IO bus speed;
  bi-directional data path means coupled between said databus of said system bus and said databus of said IO bus and responsive to said plurality of data cycles, said data path for routing data between said system and IO buses according to said protocols, such that said data path directs bytes of said data to specific data lines to perform byte steering and dynamic bus sizing on said data from said system bus to said IO bus; and
  bi-directional address transceiver means coupled between said databus of said system bus and said databus of said IO bus and responsive to said plurality of data cycles for routing addresses between said system and said IO buses,
  wherein devices on either of said buses transfer data to devices on the other of said buses according to their bus protocols, such that said first and second buses operate as one single bus.

7. The bus adapter as in claim 6 wherein said system bus operates at either approximately 25 or 33 MHz and said IO bus operates at either approximately 15.6672 or 24.28416 MHz.

8. The bus adapter as in claim 6 further including timeout logic means for terminating said data cycles from one of said devices assuming ownership of said buses, wherein said timeout logic counts bus clock cycles to a predetermined number, such that said timeout logic generates a bus error where said data cycles are not acknowledge by the time said timeout logic counts to said predetermined number.

9. The bus adapter as in claim 6 wherein said system and IO buses are a system bus with a processor and an IO bus without a processor respectively.

10. A bi-directional bus adapter coupled between a system bus and an IO bus, said system bus operating at either approximately 25 or 33 MHz and containing a processor, said IO bus operating at either approximately 15,6672 or 24.28416 MHz, said buses consisting of data, address and control lines, said system and IO buses containing a plurality of system and IO data transferring devices, each generating a first plurality of data cycles to send and receive data according to a predetermined data bus size, said system and IO buses operating at system and IO speeds respectively with system and IO protocols respectively, said system and IO speeds and system and IO protocols being different, said bus adapter provided to allow said devices coupled to either of said buses to transfer data to devices contained on the other of said buses, said bus adapter comprising:
  arbitration means responsive to said plurality of data cycles from said devices, said arbitration means for determining ownership based upon priority of said system and IO buses by only one of said devices at any given time;
  system cycle generation means responsive to said plurality of data cycles from said IO bus for generating system bus data cycles necessary to complete a data transfer to said system bus according to said system bus protocol;
  IO cycle generation means responsive to said plurality of data cycles from said system bus for generating IO bus data cycles necessary to complete a data transfer to said IO bus according to said IO bus protocol;
  system synchronization means responsive to said system bus data cycles from said system cycle generation means, said system synchronization means for converting said system bus data cycles generated by said system cycle generation means from said IO bus speed to said system bus speed;

IO synchronization means responsive to said IO bus data cycles from said IO cycle generation means, said IO synchronization means for converting said IO bus data cycles generated by said IO cycle generation means from said system bus speed to said IO bus speed;

bi-directional data path means coupled between said databus of said system bus and said data bus of said IO bus and responsive to said plurality of data cycles, said data path for routing data between said system and IO buses according to said protocols, such that said data path directs bytes of said data to specific data lines to perform byte steering and dynamic bus sizing on said data from said system bus to said IO bus; and bi-directional address transceiver means coupled between said databus of said sustem bus and said databus of said IO bus and responsive to said plurality of data cycles for routing addresses between said system and said IO buses, wherein devices on either of said buses transfer data to devices on the other of said buses according to their bus protocols, such that said first and second buses operate as one single bus.

* * * * *